US 12,385,696 B2

(12) United States Patent
Metezeau et al.

(10) Patent No.: US 12,385,696 B2
(45) Date of Patent: Aug. 12, 2025

(54) HEAT EXCHANGER FOR A MOTOR VEHICLE

(71) Applicant: Valeo Systemes Thermiques, La Verriere (FR)

(72) Inventors: Frederic Metezeau, La Verriere (FR); Francois Villalonga, La Verriere (FR); Mateusz Lipowski, Skawina (PL); Lukasz Pietrzak, Skawina (PL)

(73) Assignee: Valeo Systemes Thermiques, La Verriere (FR)

( * ) Notice: Subject to any disclaimer, the term of this patent is extended or adjusted under 35 U.S.C. 154(b) by 329 days.

(21) Appl. No.: 17/912,304

(22) PCT Filed: Mar. 18, 2021

(86) PCT No.: PCT/EP2021/056998
§ 371 (c)(1),
(2) Date: Mar. 10, 2023

(87) PCT Pub. No.: WO2021/185987
PCT Pub. Date: Sep. 23, 2021

(65) Prior Publication Data
US 2023/0194181 A1 Jun. 22, 2023

(30) Foreign Application Priority Data
Mar. 20, 2020 (FR) ...................... 2002730

(51) Int. Cl.
*F28D 7/16* (2006.01)
*F02B 29/04* (2006.01)
(Continued)

(52) U.S. Cl.
CPC .......... *F28D 7/1684* (2013.01); *F02B 29/045* (2013.01); *F28F 9/0224* (2013.01);
(Continued)

(58) Field of Classification Search
CPC .. F28D 7/1684; F28D 21/00; F28D 2021/008; F28D 2021/0082; F28F 9/0224; F28F 9/18; F28F 9/182; F28F 2275/06
See application file for complete search history.

(56) References Cited

U.S. PATENT DOCUMENTS 6,595,274 B2    7/2003  Hayashi et al.
8,261,815 B2    9/2012  Schienemann et al.
(Continued)

FOREIGN PATENT DOCUMENTS

DE    102016011254 A1    3/2018
EP         1995544 A2   11/2008
(Continued)

OTHER PUBLICATIONS

Machine translation of FR-3030709 (Year: 2024).*
(Continued)

*Primary Examiner* — Len Tran
*Assistant Examiner* — Hans R Weiland
(74) *Attorney, Agent, or Firm* — Valeo Systemes Thermiques

(57) ABSTRACT

The main object of the invention is a heat exchanger including a first header plate of an inlet manifold, a second header plate of a distribution header and a heat exchange core bundle extending between the first header plate and the second header plate along a longitudinal direction, the heat exchange core bundle being defined by a shell and having a plurality of tubes arranged successively next to each other in a transverse direction, each tube being capable of cooperating with the header plates via through-holes formed in each plate. The shell has at least one longitudinal end with a straight edge configured to be in flat surface contact with (Continued)

at least one header plate in a contact area, the surface contact occurring mainly in a plane perpendicular to the longitudinal direction.

7 Claims, 5 Drawing Sheets

(51) Int. Cl.
   *F28F 9/02* (2006.01)
   *F28F 9/18* (2006.01)
   *F28D 21/00* (2006.01)

(52) U.S. Cl.
   CPC ........ *F28F 9/182* (2013.01); *F28D 2021/008* (2013.01); *F28F 2275/06* (2013.01)

(56) References Cited

U.S. PATENT DOCUMENTS

| | | | |
|---|---|---|---|
| 9,599,412 B2* | 3/2017 | Garret | F28F 9/0226 |
| 9,791,220 B2 | 10/2017 | Riondet et al. | |
| 2015/0129186 A1 | 4/2015 | Day | |
| 2018/0073469 A1 | 3/2018 | Yoon et al. | |
| 2021/0131739 A1* | 5/2021 | Ciaffarafa | F28D 9/0062 |

FOREIGN PATENT DOCUMENTS

| | | | | |
|---|---|---|---|---|
| FR | 2968750 A1 | | 6/2012 | |
| FR | 3030709 A1 | * | 6/2016 | .......... F02B 29/0462 |

OTHER PUBLICATIONS

European Patent Office, International Search Report (with English translation) and Written Opinion of corresponding International Application No. PCT/EP2021/056998, dated Apr. 7, 2021.

China Patent Office, Office Action (with English translation) of corresponding Chinese Patent Application No. 202180023266.6, dated Dec. 30, 2024, 28 pages.

* cited by examiner

HEAT EXCHANGER FOR A MOTOR VEHICLE

CROSS-REFERENCE TO RELATED APPLICATIONS

This application is filed under 35 U.S.C. § 371 U.S. National Phase of International Application No. PCT/EP2021/056998 filed Mar. 18, 2021 (published as WO2021185987), which claims priority benefit to French Application No. 2002730 filed on Mar. 20, 2020, the disclosures of which are herein incorporated by reference in their entirety.

TECHNICAL FIELD

The invention relates to a heat exchanger for a motor vehicle, and it relates more particularly to a heat exchanger liable to cool the supply air of the vehicle engine.

BACKGROUND OF THE INVENTION

Such an exchanger may have an intake manifold and a distribution manifold framing a heat-exchange core that is able to channel fluids and that is configured to allow an exchange of heat between the fluids when they cross in the heat exchanger.

The heat-exchange core comprises tubes in which a first fluid passing through the heat exchanger circulates, the second fluid being guided to circulate between the tubes. It is thus at these tubes that the gases are cooled, notably by an exchange of heat energy with a cooling fluid that is advantageously a heat-transfer fluid. In other words, the cooling fluid circulates through the heat-exchange core, between the tubes, and thus contributes to the cooling of the gases circulating in the tubes.

The heat-exchange core thus has a sealed internal volume in which the cooling fluid circulates. It is known to delimit this internal volume by way of three groups of elements, namely by way of the intake and distribution manifolds, by way of a first and a last tube extending at ends of the heat-exchange core and by way of a shell surrounding the tubes of the heat exchanger.

BRIEF SUMMARY OF THE INVENTION

In order to avoid any leakage zone of the cooling fluid, particular attention is given to the connecting zones between the various components that delimit the internal volume of the heat-exchange core, so as to notably prevent the cooling liquid from being able to leak out of the heat exchanger at these connecting zones.

The invention lies within this context, and concerns a heat exchanger comprising a first header plate of an intake manifold, a second header plate of a distribution manifold and a heat-exchange core extending between the first header plate and the second header plate along a longitudinal direction, the heat-exchange core being delimited by a shell and comprising a plurality of tubes that are disposed successively next to one another in a transverse direction, each tube being able to cooperate with the header plates via through-orifices that are produced in each plate, characterized in that the shell has at least one longitudinal end with a straight edge configured to be in planar surface contact with at least one header plate in a contact zone, the surface contact being realized mainly in a plane perpendicular to the longitudinal direction.

The invention thus relates to a heat exchanger whose function is to cool a first fluid notably by virtue of a second fluid. When the heat exchanger is put into position, the intake manifold receives the first fluid, this fluid then passes through the heat-exchange core to the distribution manifold. While passing through the heat-exchange core, the first fluid is cooled by a second fluid, the cooled first fluid then arriving at the distribution manifold.

The second fluid is guided in circulation in the heat-exchange core by virtue of the shell of the heat-exchange core. This requires the heat exchanger to be sealed in order to prevent the second fluid from leaking out of the heat exchanger.

Surface contact is understood to mean contact which extends at least in one plane, this plane in this case being a plane substantially perpendicular to the longitudinal direction.

The shell is thus in contact with at least one of the manifolds, and advantageously both manifolds, in a plane perpendicular to the longitudinal direction. During the mounting of the header plate on the heat-exchange core, the end with a straight edge of the shell makes it possible to push the header plate all the way in as far as the stop and thus to ensure that the header plate is as close as possible to the shell before the brazing operation.

According to an optional feature of the invention, the shell is also in planar surface contact with the at least one header plate in a plane parallel to the longitudinal direction.

According to another optional feature of the invention, the tubes are disposed successively next to one another in the transverse direction and wherein the shell has at least one transverse wall which extends in this transverse direction while being in contact with each of the tubes, the surface contact between header plate and tube being formed at the longitudinal end of this transverse wall.

According to another optional feature of the invention, the header plate has a perforated wall, in which the through-orifices are produced, and a frame arranged at the periphery of the perforated wall and configured to cooperate with the shell.

According to various optional features of the invention, taken alone or in combination, it may be provided that:
  the perforated wall has, in the vicinity of each through-orifice, a clearance formed by a rounded edge or a chamfer, and wherein the at least one longitudinal end with a straight edge of the shell comprises at least one protuberance which extends the shell along the longitudinal direction and which has a shape and dimensions complementary to the clearance;
  each protuberance has a transverse dimension substantially equal to the transverse dimension of the tube disposed in the corresponding contact zone;
  each protuberance has a vertical dimension C smaller than the vertical dimension of the transverse wall;
  the plurality of tubes of the heat-exchange core comprises at least one first tube and a last tube that are disposed respectively at each transverse end of the plurality of tubes, the shell comprising at least one first protuberance in contact with the first tube and a second protuberance in contact with the last tube.

A protuberance is understood to mean an extension of the shell from one of its longitudinal ends. The main function of the protuberance is to reinforce the sealing function of the shell, notably by positioning it in a space where the second fluid may leak. In this way, the protuberance is configured to be positioned at one of the contact zones of the shell with the intake and/or distribution manifold.

The protuberance may be of one piece with the shell. The term "of one piece" is understood to mean that the protuberance and the shell can only be separated by destruction of one of the two elements.

The protuberance at least partially extends one of the longitudinal ends of the shell along the longitudinal direction, but the protuberance may also extend along another direction. For example, the protuberance may extend along a direction parallel to the direction in which the plurality of tubes are aligned.

According to an optional feature of the invention, the perforated wall is pressed locally, around each of the through-openings, so as to have a rolled end edge forming a border protruding from the perforated wall and to increase the contact surface with the tubes.

According to an optional feature of the invention, the shell has a first longitudinal end with a straight edge in contact with the first header plate at a first contact zone and a second longitudinal end with a straight edge in contact with the second header plate at a second contact zone.

Each of the longitudinal ends of the shell is in contact with either the header plate associated with the intake manifold or the header plate associated with the distribution manifold, thus forming a first contact zone at the intake manifold and a second contact zone at the distribution manifold.

As has been specified above, at least one of the contact zones of the shell is a surface contact in a plane perpendicular to the longitudinal direction. Thus, the first contact zone or the second contact zone reproduces a surface contact in a plane perpendicular to the longitudinal direction in accordance with the invention.

Advantageously, each contact zone of the shell with the intake manifold and the distribution manifold is a surface contact in a plane perpendicular to the longitudinal direction.

BRIEF DESCRIPTION OF THE DRAWINGS

Further features, details and advantages of the invention will become more clearly apparent from reading the following description, and from a number of exemplary embodiments given by way of nonlimiting indication, with reference to the appended schematic drawings, in which.

DETAILED DESCRIPTION OF THE INVENTION

The features, variants and different embodiments of the invention may be combined with one another, in various combinations, as long as they are not mutually incompatible or mutually exclusive. In particular, variants of the invention can be contemplated that only comprise a selection of features that are described hereafter independently of the other features described, if this selection of features is sufficient to provide a technical advantage and/or to differentiate the invention from the prior art.

Figure 1:
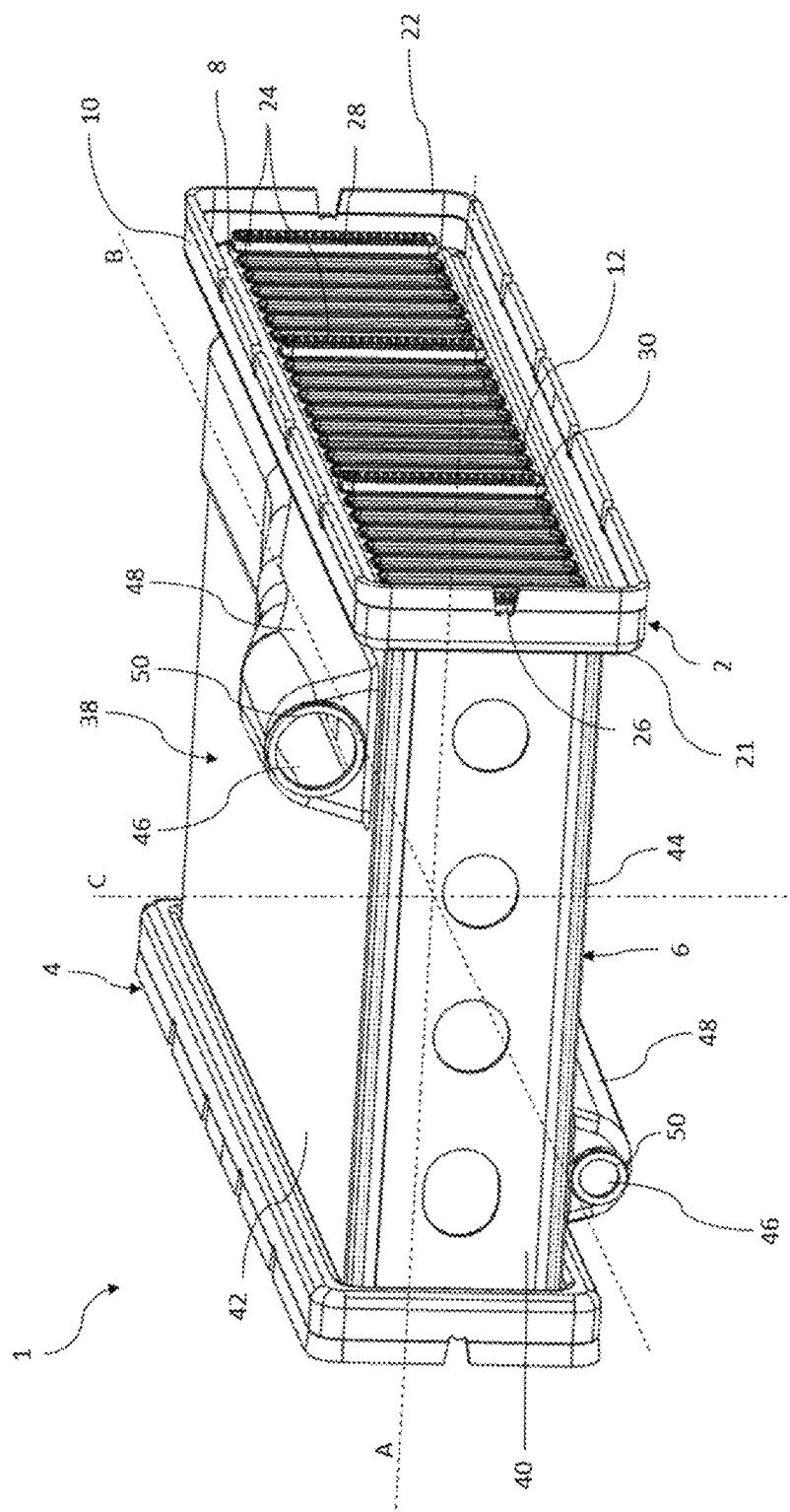
FIG. 1 is a perspective representation of a heat exchanger according to the invention.

FIG. 1 illustrates a heat exchanger 1 according to the invention, for a motor vehicle and which may notably constitute a cooling radiator of an engine or a heating radiator of the passenger compartment of this vehicle.

The heat exchanger 1 adopts the overall shape of a rectangular parallelepiped and comprises at least one intake manifold (not shown here) able to be fixed to a first header plate 2, a distribution manifold (not shown here) able to be fixed to a second header plate 4 and a heat-exchange core 6 extending between the intake manifold and the distribution manifold along a longitudinal direction A. The heat-exchange core 6 is notably configured to allow an exchange of heat between a first fluid and a second fluid.

The first fluid may be, for example, the charge air intended to supply the engine of the vehicle, and the second fluid may be a cooling liquid or air depending on whether the heat exchanger is of the air-water type or of the air-air type.

The first header plate 2 and the second header plate 4 each represent an opposite face of the rectangular parallelepiped, the heat-exchange core 6 being disposed between these header plates 2, 4 and formed, as will be described below, by an external shell 38 and a plurality of tubes 24 that are arranged in parallel with one another inside this shell 38. The heat-exchange core 6 is such that the first fluid is made to circulate inside each of the tubes and the second fluid is made to circulate between the tubes, the heat exchange taking place from one fluid to the other at the tubes.

Figure 2:
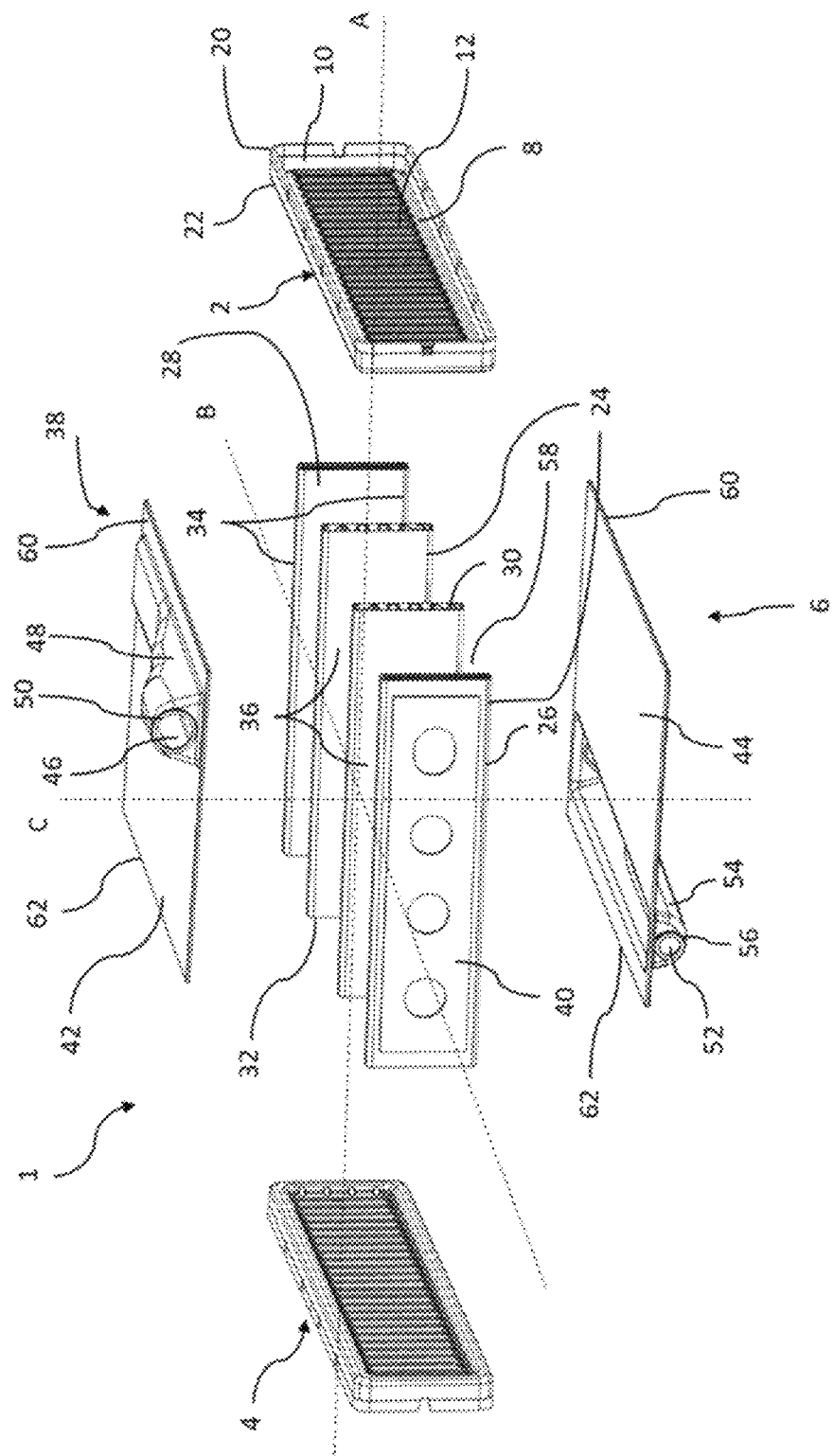
FIG. 2 is an exploded view of the various components of the heat exchanger in FIG. 1.

With reference notably to FIGS. 1 and 2, the first header plate 2 and the second header plate 4 are mutually symmetrical with respect to the heat-exchange core 6 and to the longitudinal direction A. In this way, a feature described for one header plate will also be applicable to the other header plate, whether the latter is intended to be secured to the intake manifold or to the distribution manifold. In addition, the general term "header plate 2, 4" will refer equally to the first header plate 2 and to the second header plate 4 in the rest of the description.

The header plate 2, 4 extends mainly in a plane perpendicular to the longitudinal direction A, the main dimension of the header plate 2, 4 being measured along a transverse direction B perpendicular to the longitudinal direction A.

The header plate 2, 4 comprises a perforated wall 8 delimited at the periphery by a frame 10. More particularly, the header plate 2, 4 has a plurality of bars that are arranged parallel to one another, perpendicularly with respect to the transverse direction B, while extending between two opposite edges of the frame 10 so as to define a plurality of through-openings 12 through which a fluid, and notably the charge air intended to supply the engine of the vehicle, can circulate. These through-openings 12 are in this case represented with an elongated shape, such as a rectangle for example, the greatest dimension of which is measured along a vertical direction C perpendicular to the longitudinal A and transverse B directions. Each through-opening 12 is dimensioned so as to receive the end of one of the tubes 24 that form part of the heat-exchange core 6 and as will be described below. It is thus understood that the fluid made to pass through the manifold and the corresponding through-openings 12 originates from the tubes 24 or is directed inside the tubes 24, depending on whether the manifold is an inlet or outlet manifold.

The frame 10 forms an extension of the periphery of the perforated wall 8 along the longitudinal direction A, over the entire perimeter of this perforated wall 8. More particularly, the frame 10 has a first portion 21 which directly extends the perforated wall 8 and which extends in the direction of the interior of the heat exchanger 1, that is to say in the direction of the heat-exchange core 6, while forming a bowl surrounding the perforated wall 8, and it also comprises a second portion 22 which directly extends the first portion 21 and which extends longitudinally away from the heat-exchange core 6 while having a free end edge. The free end edge of the second portion 22 is configured to cooperate with the aforementioned supply circuit and/or the engine, whereas the first portion 21 is configured to be in contact with the heat-exchange core 6.

As illustrated more particularly in FIG. 2, the heat-exchange core 6 of the heat exchanger 1 comprises at least a plurality of tubes 24 and a shell 38.

The tubes 24 are arranged parallel to one another, each of the tubes 24 extending longitudinally between the intake manifold and the first header plate 2 and the distribution manifold and the second header plate 4 through the heat-exchange core 6. The tubes 24 are arranged successively next to one another such that it is possible to distinguish a first tube 26, disposed at one transverse end of this plurality of tubes 24, and a last tube 28, disposed at the opposite transverse end of this plurality of tubes 24.

Each tube 24 extends longitudinally between a first end 30 and a second end 32 and is disposed in the heat-exchange core 6 such that the first end 30 is in contact with the first header plate 2 and the second end 32 is in contact with the second header plate 4. Each end 30, 32 of these tubes 24 goes beyond the corresponding through-opening 12 such that the tubes 24 thus open into the intake or distribution manifold and permit the passage of fluid between these manifolds and the heat-exchange core 6. Three first ends 30 are visible in FIG. 1, the other tubes 24 not having been represented so as to render the position of the tubes 24 through the header plate 2, 4 visible.

Each tube 24 extends along the longitudinal direction A, between the one through-opening 12 of the first header plate 2 and a corresponding through-opening 12 of the second header plate 4 of the distribution manifold.

To make the figures easier to understand, only four tubes of the plurality of tubes 24 are represented in this case in FIG. 2, including the first tube 26 and the last tube 28. However, the plurality of tubes 24 generally comprises as many tubes 24 as the number of through-openings 12 in the header plates 2, 4, each tube 24 connecting a through-opening 12 of the first header plate 2 to the corresponding through-opening 12 of the second header plate 4.

Each tube 24 has a shape similar to that of the other tubes 24, namely the shape of a flat tube in this case, a section of each tube 24 corresponding to the section of a through-opening 12 of the header plates 2, 4. More specifically, the section of each tube 24 has a rectangular overall shape, the greatest dimension of which is measured along the vertical direction C. In this way, each tube 24 has two end faces 34 that are situated opposite to one another, in the vertical direction in this case, and two main faces 36 that connect the end faces 34.

The shell 38 is intended to surround the plurality of tubes 24 and to seal the zone defining the heat-exchange core 6. More particularly, the shell 38 comprises two lateral walls 40, only one of the two lateral walls 40 being visible in FIG. 2, and two transverse walls 42, 44 which each extend longitudinally between, on the one hand, the intake manifold and the first header plate 2 and, on the other hand, the distribution manifold and the second header plate 4.

Each of the lateral walls 40 extends in a plane parallel to the longitudinal A and vertical C directions, one of these lateral walls 40 being disposed on an external main face of the last tube 28 of the plurality of tubes 24, whereas the other lateral wall 40 is disposed on an external main face of the first tube 26 of the plurality of tubes 24. It is understood that the external main face of the first tube 26 and the external main face of the last tube 28 face away from one another, toward the outside of the heat-exchange core 6, such that the lateral walls 40 of the shell 38 transversely frame the plurality of tubes 24.

The transverse walls 42, 44 each extend in a plane parallel to the longitudinal A and transverse B directions. These transverse walls 42, 44 extend between the header plates 2, 4 along the longitudinal direction A and between the lateral walls 40 along the transverse direction B. The transverse walls 42, 44 vertically frame the plurality of tubes 24.

Each transverse wall 42, 44 comprises a planar portion intended to be placed against the end faces 34 of the tubes 24 and a pressed part 48 forming a fluid circulation molding which extends mainly perpendicularly with respect to the direction of elongation of the tubes 24, namely the longitudinal direction in this case. This pressed part forms a part curved toward the outside of the heat-exchange core 6, and it has a fluid inlet 52 or outlet 46 equipped with a circular orifice 50, 56 through which the fluid enters or exits the fluid circulation molding. The pressed part 48, 54 extends over the entire dimension of the corresponding transverse wall 42, 44 along the transverse direction B, the fluid circulation molding 48 making it possible to distribute the fluid passing into the heat-exchange core 6 between each of the tubes 24 or to recover all of the fluid circulating between each of the tubes 24 depending on whether the transverse wall and its circulation molding are associated with a fluid inlet or a fluid outlet.

The disposition of the lateral walls 40 and transverse walls 42, 44 of the shell 38 delimits an internal volume of the heat-exchange core 6, in which the plurality of tubes 24 extends and inside which the first fluid and the second fluid circulate, inside the tubes 24 and between the tubes 24, respectively.

The transverse walls 42, 44 of the shell 38 have a first longitudinal end 60 liable to be in contact with the first portion 21 of the first header plate 2 and a second longitudinal end 62 liable to be in contact with the first portion 21 of the second header plate 4.

Figure 3:
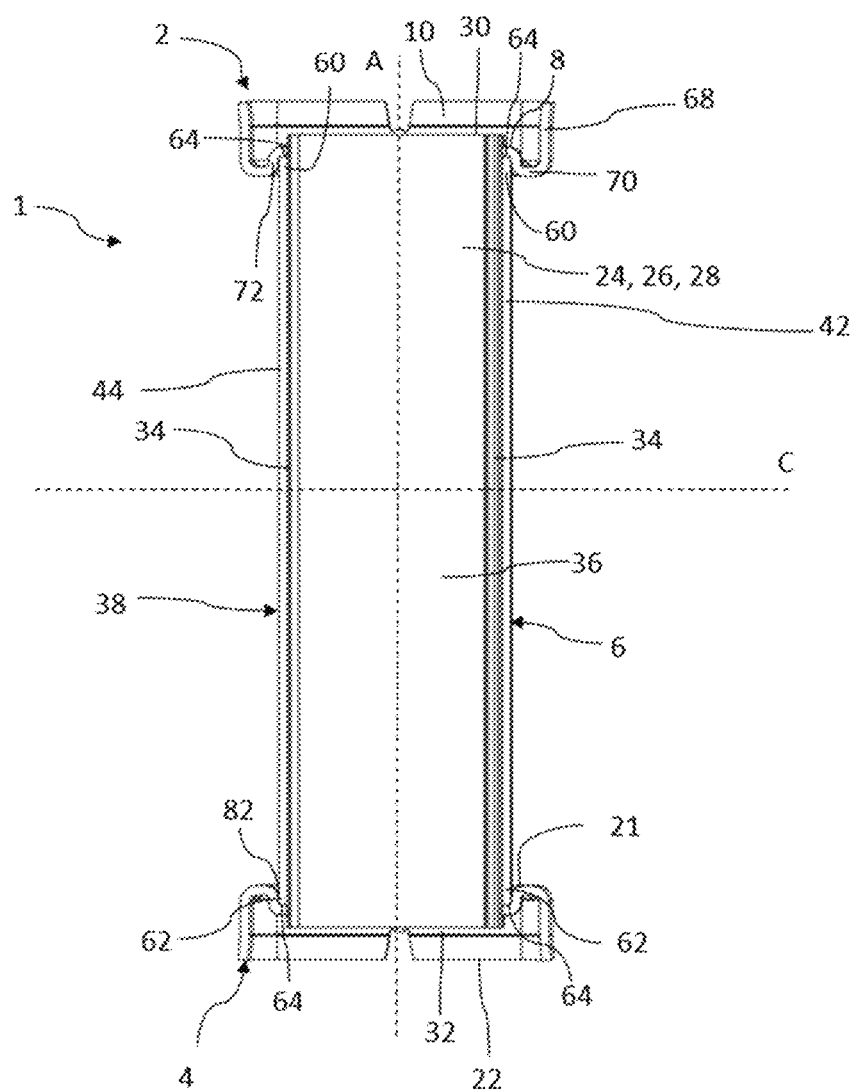
FIG. 3 is a longitudinal section of the heat exchanger in FIG. 1.

As can notably be seen in FIG. 3, this contact between the longitudinal ends 60, 62 of the transverse walls 42, 44 of the shell 38 and the first portions 21 of the header plates 2, 4 makes it possible to form contact zones 64 which seal the junction of the heat-exchange core 6 and the manifolds via the header plates 2, 4 and which thus make it possible to seal the circulation of the second fluid between the tubes 24.

To ensure the sealing of the internal volume of the heat-exchange core 6, each header plate 2, 4 comprises, at its first portion 21, a recess 82 with a shape which is complementary to that of a longitudinal end 60, 62 of the transverse walls 42, 44 of the shell 38.

Each contact zone 64 between one of the longitudinal ends 60, 62 of the shell 38 and one of the first portions 21 of the header plates 2, 4, at a recess 82, is similar, that is to say that the contact is realized in an identical manner. Thus, a feature described for one of these contact zones 64 is applicable to the other contact zones 64. In addition, the term "longitudinal end 60, 62" will be used to refer equally to the first and second longitudinal ends 60, 62 of each transverse wall 42, 44 of the shell 38 of the heat-exchange core 6 in the rest of the description.

A contact zone 64 between the recess 82 defined in the first portion 21 of a header plate 2, 4 and a longitudinal end 60, 62 of the shell 38 of the heat-exchange core 6 will now be described more particularly.

Figure 4:
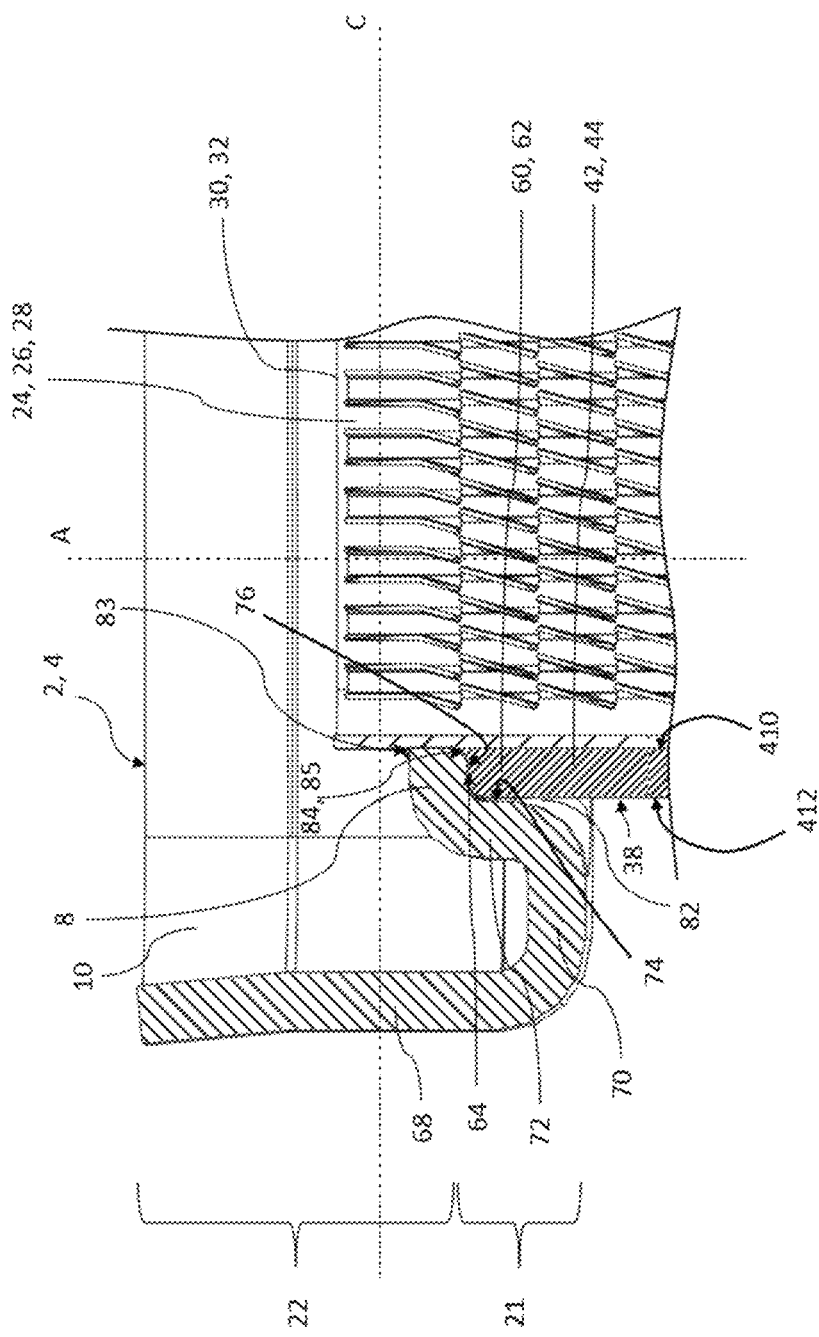
FIG. 4 is a detail of a longitudinal section of the heat exchanger in FIG. 1, rendering a shell, a header plate and a tube of this exchanger more visible.

With reference to FIG. 4, the first portion 21 is formed successively by an external wall 68, which extends in the longitudinal extension of the second portion 22, by a bottom wall 70, which forms the bottom of the aforementioned cavity while extending the external wall 68 in a substantially perpendicular manner in the direction of the interior of the header plate 2, 4, namely toward the perforated wall 8, and finally by a fold-over wall 72, which extends the bottom wall 70 in a perpendicular manner, facing the external wall 68 and as far as the perforated wall 8.

As illustrated in FIG. 4, the perforated wall 8 is pressed locally, around each of the through-openings 12, so as to have an end edge rolled toward the interior of the corresponding header plate 2, 4, that is to say in the direction of the second portion 22. In other words, the perforated wall 8 has, at the perimeter of each through-opening, a border 83 which forms a protrusion of the perforated wall 8 and which elongates the contact surface with the tubes 24 inside the corresponding header plate. This results in a corresponding clearance 85 on the opposite face of the perforated wall 8, that is to say an internal face 76 of the perforated wall 8 facing toward the heat-exchange core 6, this clearance 85 notably making it easier to insert the tube in the corresponding through-opening.

The recess 82, which is dimensioned to receive the corresponding longitudinal end 60, 62, is formed between the end faces 34 of the tubes 24, the internal face 74 of the fold-over wall 72 and the internal face 76 of the perforated wall 8, said internal faces facing toward the heat-exchange core 6.

The transverse wall 42, 44 intended to be positioned in the recess 82 is configured, according to the invention, to be in contact with the corresponding header plate 2, 4, in a planar surface contact produced in a plane perpendicular to the longitudinal direction A. To this end, the transverse wall 42, 44 has a straight edge at each longitudinal end 60, 62, that is to say an edge perpendicular to the main, in this case longitudinal and transverse, plane of elongation of the transverse wall 42, 44. As will be described below, an inclined plane forming a ramp may be locally provided at this straight edge, but it should be noted that the major part of the longitudinal end has the form of this straight edge, that is to say extending in a plane perpendicular to the main plane of elongation of the transverse wall 42, 44.

More specifically, the longitudinal end 60, 62 of one of the transverse walls 42, 44 of the shell 38, once it has been positioned in the recess 82, is in contact at least with the internal face 76 of the perforated wall 8, this contact being produced at least in a plane parallel to the transverse B and vertical C directions. The longitudinal end 60, 62 and the perforated wall 8 thus define a contact zone 64, the latter extending continuously along the transverse direction B between the first tube 26 and the last tube 28. This contact zone 64 contributes to sealing the internal volume of the heat-exchange core 6, at least at the transverse walls 42, 44 of the shell 38 and the individual header plates 2, 4 for admitting and distributing fluid.

The sealing is notably ensured by a brazing operation carried out in a suitable furnace, which tends to ensure the contact between the straight edge of the longitudinal ends of the transverse walls 42, 44 and the internal face 76 of the perforated wall 8.

The brazing operation also makes it possible to secure the transverse walls 42, 44 of the shell 38 to the end faces 34 of at least the first and the last tube 26, 28 of the plurality of tubes 24, the contact extending substantially along the longitudinal direction A between each of the longitudinal ends 60, 62 of the transverse walls 42, 44, so as to again ensure the sealing of the internal volume of the heat-exchange core 6.

According to an alternative embodiment, the end faces 34 of other tubes 24 of the plurality of tubes 24 may also be in contact with the transverse walls 42, 44 of the shell 38, these contacts contributing to the delimitation of partially enclosed spaces of the internal volume of the heat-exchange core 6.

Furthermore, the brazing operation may also make it possible to secure the longitudinal end 60, 62 of the transverse wall 42, 44 to the fold-over wall 72 of the header plate 2, 4, the contact being produced at least in a plane parallel to the longitudinal A and transverse B directions.

According to the invention, the shapes and the dimensions of the recess 82 and also of the longitudinal end 60, 62 of the transverse wall 42, 44 make it possible to insert the transverse wall 42, 44 in the recess until the surface contact between longitudinal end and perforated wall 8 is effective and forms a stop with respect to the movement. It is thus ensured that the transverse wall 42, 44 is inserted correctly before the brazing operation, that is to say that the transverse wall 42, 44 is close enough to the perforated wall 8 that the brazing operation is effective and makes it possible to ensure the sealing of the heat-exchange surface.

Figure 5:
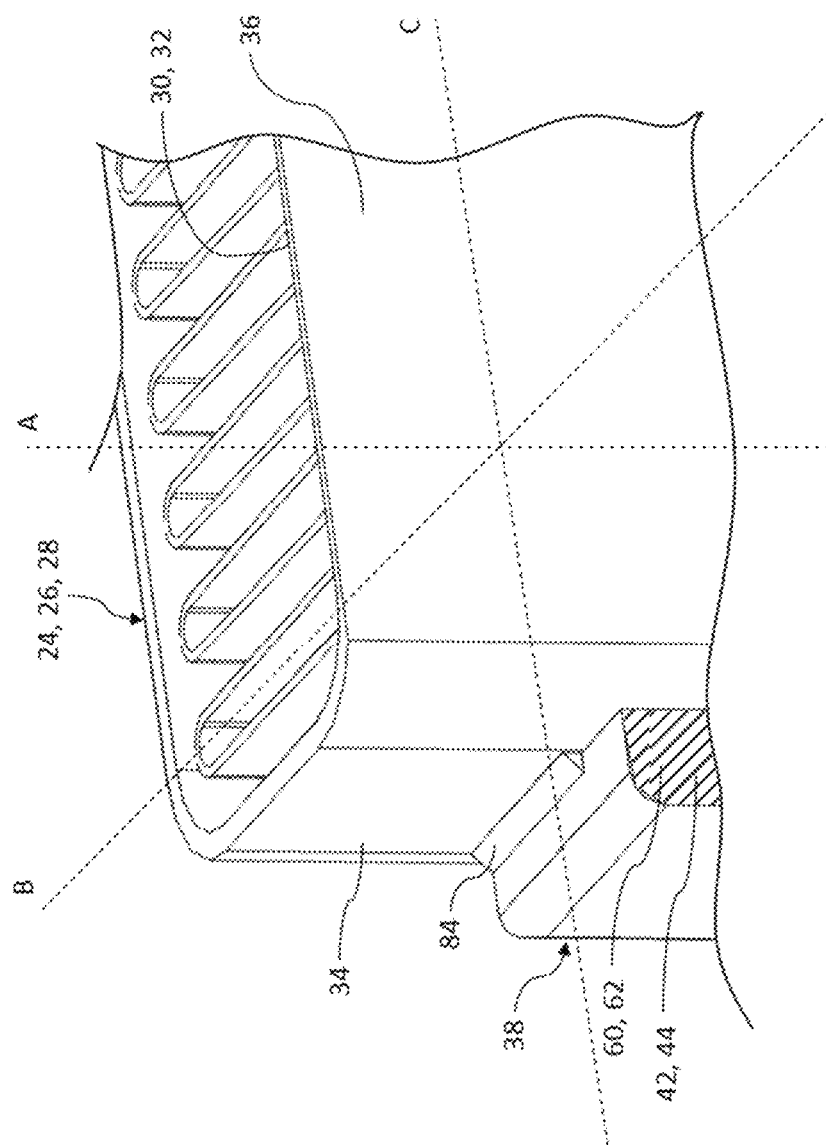
FIG. 5 is a perspective representation of a longitudinal end of a tube, rendering visible a longitudinal end edge of the shell and a protuberance in accordance with one aspect of the invention.

According to the invention, and as can be seen in FIGS. 4 and 5, the shell 38 comprises at least one protuberance 84 which locally extends the shell 38 along the longitudinal direction A. More specifically, each protuberance 84 locally extends a longitudinal end 60, 62 of a transverse wall 40, 42 of the shell 38, it being understood that this longitudinal end 60, 62 retains a shape that is predominantly planar and perpendicular to the main plane of elongation of the transverse wall 42, 44.

The at least one protuberance 84 protrudes from the longitudinal end 60, 62 and is configured to fill the clearance 85 present between the perforated wall 8 and the corresponding tube 24. As has been specified above, the border of the perforated wall 8 contributing to the delimitation of a through-opening 12 is bent such that a pressing radius contributes to the delimitation of a clearance 85 forming, between the tube 24 and the longitudinal end 60, 62 of the shell 38, a leakage space. Hence, the protuberance 84 of the longitudinal end 60, 62 is accommodated in this leakage space by exhibiting a structural complementarity with each of the components delimiting this space.

An internal surface 410 of the transverse wall 42, 44 is defined as the surface that is situated opposite to the tubes 24 on which the planar portion of the transverse wall 42, 44 comes to rest, and an external surface 412 of the transverse wall 42, 44 is defined as the opposite surface. According to the invention, and as illustrated in FIG. 5, the longitudinal end 60, 62 of the transverse wall 42, 44 predominantly has a straight edge, and the protuberance 84, which partially extends the longitudinal end 60, 62 of the shell 38 along the longitudinal direction A, locally extends in the extension of the internal surface 410, that is to say as close as possible to the internal volume of the heat-exchange core 6 so as to be able to be in contact with the tube 24. In other words, the thickness, or dimension in the vertical direction C, of the protuberance 84 is smaller than the thickness, or corresponding dimension in the same vertical direction, of the transverse wall 42, 44. As illustrated, the protuberance 84 may notably have a thickness whose value is substantially equal to 10 to 20% of the value of the thickness of the transverse wall 42, 44.

Each protuberance 84 provided in the extension of the transverse wall 42, 44 of the shell 38 extends along the transverse direction B over a distance substantially equal to the transverse dimension of the tube 24 with which this protuberance 84 is intended to be in contact.

As illustrated in FIG. 5, the protuberance 84 is arranged on the shell 38 so as to be in contact with the first tube 26 or the last tube 28 of the plurality of tubes 24, at least two protuberances 84 being provided, opposite to one another in the transverse direction B, at the same longitudinal end 60, 62 so as to cooperate with the first tube 26 and the last tube 28, respectively. Thus, the first tube 26, the last tube 28, the protuberances 84, the header plates 2, 4 and the transverse walls 42, 44 of the shell 38 delimit an airtight space for circulation of a fluid, notably after a brazing operation that is made possible by the proximity of the material of each of the components mentioned above before passing into the brazing furnace. Specifically, each of the specified elements contributes to guiding the circulation of a fluid between the tubes 24 from the first transverse wall 42 of the shell 38 to the second transverse wall 44 of the shell 38.

According to an alternative embodiment, the shell 38 may comprise a protuberance 84 at each contact zone 64 close to a tube 24, in addition to those provided to be in contact with the first and last tubes 26, 28. In this way, the protuberances 84 delimit various airtight circulation spaces in the internal volume of the heat-exchange core 6, the number of airtight circulation spaces thus being correlated with the number of protuberances 84 of the shell 38.

The protuberance 84 is produced in one piece with the corresponding transverse wall 40, 42, so as to advantageously form an assembly of one piece with the shell 38. This feature facilitates the manufacture and the mounting of the heat exchanger 1, but it should be noted that a protuberance 84 forming an entity that is produced separately from the shell 38 and that is attached thereto would not depart from the scope of the invention.

The protuberance 84 is composed of a material similar to the shell 38 and to the header plates 2, 4. Specifically, as mentioned above, during the mounting of the heat exchanger 1, the perforated wall 8 at the contact zone 64 and the longitudinal end 60, 62 are at least partially secured to one another by brazing, and the filler material necessary for the brazing operation should be chemically secured to the protuberance 84, the longitudinal end 60, 62 and the header plate 2, 4.

To make the invention easier to understand, the operation of the heat exchanger 1, and notably of the circulation of the various fluids passing through it, will now be described.

As a reminder, the function of the heat exchanger 1 is to cool gases circulating through the latter.

The intake manifold receives the gases from the supply circuit of the engine and then guides them, via the first header plate 2, to the heat-exchange core 6 through the plurality of tubes 24 in which they are cooled, increasing their oxygen concentration. The cooled gases are then guided to the distribution manifold 4 and to the engine.

The gases are cooled in the plurality of tubes 24 by an exchange of heat with another fluid, through the wall of each tube 24 of the plurality of tubes 24. The second fluid circulates between the plurality of tubes 24 in the internal volume of the heat-exchange core 6 from the circular orifice 50 of the first transverse wall 42 to the circular orifice 50 of the second transverse wall 44.

The second fluid may, for example, be a heat-transfer fluid, which cools the gases circulating in the plurality of tubes 24.

As mentioned above, the contact zone 64 between the longitudinal end 60, 62, the protuberance 84 and the perforated wall 8 and its clearance 85, and also the contact between the transverse walls 42, 44 and the first and last tubes 26, 28, contribute to sealing the heat-exchange core 6 so as to limit the possibility of the other fluid circulating in the internal volume of the heat-exchange core 6 leaking.

The invention is not, however, limited to the means and configurations described and illustrated here, but also extends to any equivalent means or configuration described and illustrated here, and also extends to any equivalent means or configuration and to any technically operational combination of such means. In particular, the internal volume of the heat-exchange core 6 may be passed through by at least two fluids, the transverse walls 42, 44 then comprising two fluid inlets, two distribution bearings, two receiving bearings and two fluid outlets, a protuberance 84 being positioned at each contact zone close to the tube 24 of the plurality of tubes 24 delimiting the two circulation spaces of the fluids.

What is claimed is:

1. A heat exchanger comprising a first header plate, a second header plate and a heat-exchange core extending between the first header plate and the second header plate along a longitudinal direction, the heat-exchange core being delimited by a shell and including a plurality of tubes that are disposed successively next to one another in a transverse direction, each tube being able to cooperate with the first and second header plates via through-orifices that are produced in each of the first and second header plates, wherein the shell has at least one longitudinal end configured to be in planar surface contact with at least one of the first and second header plates in a contact zone, the planar surface contact being realized in a plane perpendicular to the longitudinal direction wherein at least one of the first and second header plates has a perforated wall, in which the through-orifices are produced, and a frame arranged at the periphery of the perforated wall and configured to cooperate with the shell, wherein the perforated wall has, in the vicinity of each through-orifice, a clearance formed by a rounded edge or a chamfer, and wherein the at least one longitudinal end of the shell includes at least one protuberance which extends the shell along the longitudinal direction and which has a shape and dimensions complementary to the clearance, wherein the at least one protuberance has, along the whole extension length thereof, a vertical dimension smaller than the vertical dimension of a transverse wall of the shell that extends in the transverse direction while being in contact with each of the plurality of tubes, the vertical dimension being measured in a vertical direction that is perpendicular to the longitudinal direction and the transverse direction.

2. The heat exchanger as claimed in claim 1, wherein the shell is also in planar surface contact with the at least one of the first and second header plates in a plane parallel to the longitudinal direction.

3. The heat exchanger as claimed in claim 1, wherein the plurality of tubes is disposed successively next to one another in the transverse direction, the surface contact between at least one of the first and second header plates and each of the plurality tubes being formed at the longitudinal end of the at least one transverse wall.

4. The heat exchanger as claimed in claim 1, wherein the at least one protuberance has a transverse dimension substantially equal to the transverse dimension of the tube disposed in the corresponding contact zone.

5. The heat exchanger as claimed in claim 1, wherein the plurality of tubes of the heat-exchange core includes a first tube and a last tube that are disposed respectively at each transverse end of the plurality of tubes, the shell including a first protuberance in contact with the first tube and a second protuberance in contact with the last tube.

6. The heat exchanger as claimed in claim 1, wherein the perforated wall is pressed locally, around each of the through-openings, so as to have a rolled end edge forming a border protruding from the perforated wall and to increase the contact surface with the plurality of tubes.

7. The heat exchanger as claimed in claim 1, wherein the least one longitudinal end of the shell includes a first longitudinal end in contact with the first header plate at a first contact zone and a second longitudinal end in contact with the second header plate at a second contact zone.

\* \* \* \* \*